(12) United States Patent
Ruiz Balmaseda et al.

(10) Patent No.: US 11,202,191 B2
(45) Date of Patent: Dec. 14, 2021

(54) METHODS AND DEVICES FOR SUPPORTING USER EQUIPMENT, UE, AUTHORIZATION BASED ON THE TYPE OF ACCESS NETWORK AS WELL AS BASED ON THE TYPE OF RADIO ACCESS TECHNOLOGY, RAT

(71) Applicant: Telefonaktiebolaget LM Ericsson (publ), Stockholm (SE)

(72) Inventors: Cristina Ruiz Balmaseda, Madrid (ES); David Castellanos Zamora, Madrid (ES); Maria Pilar González López, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 3 days.

(21) Appl. No.: 16/649,443

(22) PCT Filed: Oct. 11, 2017

(86) PCT No.: PCT/EP2017/075946
§ 371 (c)(1),
(2) Date: Mar. 20, 2020

(87) PCT Pub. No.: WO2019/063107
PCT Pub. Date: Apr. 4, 2019

(65) Prior Publication Data
US 2020/0275254 A1      Aug. 27, 2020

(30) Foreign Application Priority Data
Sep. 28, 2017   (EP) ..................... 17382644

(51) Int. Cl.
*H04W 8/04* (2009.01)
*H04W 8/06* (2009.01)
(Continued)

(52) U.S. Cl.
CPC ............... *H04W 8/04* (2013.01); *H04W 8/06* (2013.01); *H04W 8/12* (2013.01); *H04W 48/02* (2013.01);
(Continued)

(58) Field of Classification Search
CPC ........... H04W 8/04; H04W 8/06; H04W 8/12; H04W 48/02; H04W 48/18; H04W 60/005; H04W 88/06
(Continued)

(56) References Cited

U.S. PATENT DOCUMENTS

2015/0208293 A1* 7/2015 Zhang ............... H04W 36/0077
455/433
2017/0374604 A1* 12/2017 Stenfelt ................. H04W 36/12

FOREIGN PATENT DOCUMENTS

WO    2016119841 A1    8/2016
WO    2016202379 A1    12/2016

OTHER PUBLICATIONS

3GPP TS 23.502 V1.2.0 Sep. 2017.*
(Continued)

*Primary Examiner* — William Nealon
(74) *Attorney, Agent, or Firm* — Murphy, Bilak & Homiller PLLC (57) ABSTRACT

A method of registering a User Equipment, UE, in a communication network, said method comprising the steps of receiving, by a control node in said core network, from an access network, a registration request message for registering a UE in said communication network, transmitting, by said control node, to a subscriber node in said communication network, a subscription request message, wherein said subscription request message requests subscription information for said UE and comprises an identification of a type of said access network, AN, via which said UE registration
(Continued)

request message is received and an identification of a Radio Access Technology, RAT, used by said UE for connecting to said access network, receiving, by said control node, from said subscriber node, a subscription response message comprising said subscription information for said UE based on said AN and said RAT and transmitting, by said control node, to said UE, a registration complete message for indicating that said UE has registered in the communication network.

21 Claims, 4 Drawing Sheets

(51) Int. Cl.
  H04W 48/02 (2009.01)
  H04W 60/00 (2009.01)
  H04W 88/06 (2009.01)
  H04W 8/12 (2009.01)
  H04W 48/18 (2009.01)
(52) U.S. Cl.
  CPC ......... *H04W 48/18* (2013.01); *H04W 60/005* (2013.01); *H04W 88/06* (2013.01)
(58) Field of Classification Search
  USPC ........................................................ 370/328
  See application file for complete search history.

(56) References Cited

OTHER PUBLICATIONS

Unknown, Author, "3rd Generation Partnership Project; Technical Specification Group Core Network and Terminals; Evolved Packet System (EPS); 3GPP EPS AAA interfaces (Release 14)", 3GPP TS 29.273 V14.3.0, Jun. 2017, pp. 1-197.

Unknown, Author, "3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 15)", 3GPP TS 29.272 V15.0.0, Jun. 2017, pp. 1-164.

Unknown, Author, "3rd Generation Partnership Project; Technical Specification Group Core Network and Terminals; Technical realization of Operator Determined Barring (ODB) (Release 14)", 3GPP TS 23.015 V14.0.0, Mar. 2017, pp. 1-30.

Unknown, Author, "3rd Generation Partnership Project; Technical Specification Group Services and System Aspects; Architecture enhancements for non-3GPP accesses (Release 15)", 3GPP TS 23.402 V15.0.0, Jun. 2017, pp. 1-313.

Unknown, Author, "3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401 V15.0.0, Jun. 2017, pp. 1-386.

Unknown, Author, "3rd Generation Partnership Project; Technical Specification Group Services and System Aspects; Procedures for the 5G System; Stage 2 (Release 15)", 3GPP TS 23.502 V1.0.0, Sep. 2017, pp. 1-166.

Unknown, Author, "3rd Generation Partnership Project; Technical Specification Group Services and System Aspects; System Architecture for the 5G System; Stage 2 (Release 15)", 3GPP TS 23.501 V1 3.0, Sep. 2017, pp. 1-174.

Unknown, Author, "Discussion on the selection function", 3GPP TSG CT4 Meeting #72bis; C4-162043; Ljubljana (Slovenia), Apr. 11-15, 2016, pp. 1-5.

Unknown, Author, "Registration procedure", SA WG2 Meeting #118-BIS; S2-170213; Spokane, WA, USA, Jan. 16-20, 2017, pp. 1-9.

* cited by examiner

METHODS AND DEVICES FOR SUPPORTING USER EQUIPMENT, UE, AUTHORIZATION BASED ON THE TYPE OF ACCESS NETWORK AS WELL AS BASED ON THE TYPE OF RADIO ACCESS TECHNOLOGY, RAT

TECHNICAL FIELD

The present disclosure generally relates to the field of communication networks. More particularly, the present disclosure relates to a method of providing subscription information of a particular User Equipment, UE, based on the Access Network type as well as the Radio Access Technology type with which said UE requests registration to said communication network.

BACKGROUND

The Evolved Packet Core, EPC, provides mechanisms for a User Equipment, UE, to get connectivity services via 3rd Generation Partnership Project, 3GPP, access Radio Access Technologies, RAT's, such as Evolved UMTS Terrestrial Radio Access Network, EUTRAN, or UTRAN/GSM EDGE Radio Access Network, GERAN, via Serving GPRS Support Node, SGSN—Mobility Management Entity, MME and non-3GPP access via 3GPP Authentication, Authorization and Accounting, AAA.

The Home Subscriber Server, HSS, node supports those accesses by providing Evolved Packet System, EPS, security information and EPS subscription data via S6a/S6d and SWx respectively based on the architecture defined in 23.401 and 23.402 respectively.

The next generation core network (5GC) being standardized by 3GPP Rel 15, provides a unified access architecture to both 3GPP, e.g. New Radio, and non-3GPP access, i.e. Wi-Fi, fix access, via a single Access Management Function, AMF, common to both access network types.

In addition to the AMF, other network elements are introduced in 5GC such as Unified Data Management, UDM, i.e. the HSS evolution in 5G, to manage the subscription data and a session management function, SMF. AMF has similar functions as the Mobility Management Entity, MME, in EPC and SMF as Serving Gateway/Packet Gateway, SGW/PGW, in EPC. The 5GC architecture and procedures are being specified in 23.501 and 23.502

Due to the different characteristics of 3GPP and non-3GPP accesses, some EPC operators have requested the possibility to provide different subscription information to the UEs depending on the access being used, mainly regarding the list of authorized Access Point Names, APN's, and separate barring control, e.g. to allow Internet Protocol Multimedia Subsystem, IMS, voice service over Long Term Evolution, LTE, and not over Wi-FI, and vice versa. In EPC, this can be achieved by making HSS providing different subscription data over S6a/S6d to MME/SGSN and to 3GPP AAA over SWx enabling a different set of services for a particular UE over 3GPP and non-3GPP accesses.

Network operators are demanding improved means to further control the EPS services the UE can enjoy, depending on the access network or region the user is registered on.

S6a/S6d and SWx are interfaces allowing HSS to provide different subscription data enabling a different set of services for a particular UE over 3GPP and non-3GPP accesses. However, it is not possible to provide different subscription data depending on the RAT type, e.g. wifi vs HRPD.

In the 5GC core network, subscription data is provided through common service based interactions, Nudm, for the AMF, i.e. access management function, and SMF, i.e. session management function.

In 5G scenarios a user registers to the 5GC from both 3GPP and non-3GPP networks via the same 5GC entity, the AMF, using the same service interactions with UDM and therefore without specific requirements, common subscription data will be provided by UDM to AMF no matter the access type, i.e. 3GPP vs non-3GPP, or RAT type the UE is making use of.

Following the above, there is a need to achieve a solution in which the authorization of User Equipment, UE, in the communication network can be based on the type of Access Network as well as based on the type of Radio Access Technology, RAT used by the UE.

SUMMARY

It is an object to provide for methods which supports the selection of subscription information for a particular UE based on the Access Network, AN, type as well as the Radio Access Technology, RAT, type used by that particular UE.

It is another object to provide devices arranged to operate in the communication network and arranged for supporting the provisioning of the subscription information based on the AN type and the RAT type.

In a first aspect of the present disclosure, there is provided a method registering a User Equipment, UE, in a communication network, wherein said communication network comprises a core network and at least one access network, wherein said core network is arranged to provide services to UE's connected to said core network via an access network In a first step, the method comprises the step of receiving, by a control node in said core network, from an access network, a registration request message for registering a UE in said communication network.

Subsequently, the method comprises the step of transmitting, by said control node, to a subscriber node in said communication network, a subscription request message, wherein said subscription request message requests subscription information for said UE and comprises an identification of a type of said access network, AN, via which said UE registration request message is received and an identification of a Radio Access Technology, RAT, used by said UE for connecting to said access network.

Further, the method comprises the steps of receiving, by said control node, from said subscriber node, a subscription response message comprising said subscription information for said UE based on said AN and said RAT and transmitting, by said control node, to said UE, a registration complete message for indicating that said UE has registered in the communication network.

It was one of the insights of the inventors that the same control node is used for registering a User Equipment, UE, in the communication network for both 3GPP and non-3GPP networks. Such a control node is, for example, an Access and Mobility Management function, AMF.

One of the advantages of the present disclosure is that it allows for higher granularity in the subscription handling for UE's accessing the core network via different Access Network types, i.e. 3GPP and non-3GPP networks, with different Radio Access Technologies, RAT's.

This allows higher flexibility for the network operator to restrict or allow the access packet data services, i.e. the Access Point Name, APN, depending on the RAT type while allowing or restricting it for other RAT types per Access Network type. The present disclosure may be applicable for both fourth Generation and the fifth Generation networks.

The method according to the present disclosure has the effect that it may increase the level of granularity for the control of the service execution from the basic differentiation of authorized Access Point Name list per AN type currently available in core networks to differentiation of both authorized Access Point Names and service characteristics per Access Point Name depending on the AN type and RAT type that the UE is making use of.

In an example, the subscription response message further comprises an indication of whether said subscription information is valid for said AN type only.

The control node requests the subscription information for that UE from the subscriber node. The subscription information is provided to the control node based on the AN type and based on the RAT type. However, the subscription information may be also be valid for other types of AN's. As such, the subscriber node may provide an indication whether the provided subscription information is valid for the specific AN type that the UE is currently using, or whether the provided subscription information is also valid for other AN types.

Following the above, an advantage may be recognized in case the same UE registers to the communication network at a further moment in time but then using a different AN type. In such a case, the control node does not necessarily need to request the subscription information from the subscriber node, as it may re-use the previously obtained subscription information. The control node was namely notified that the previously obtained subscription information is also applicable to other AN types for that particular UE.

The above reduces network communication load, as the control node does not need to signal the subscriber node for requesting the subscription information. It may simply re-use the readily available, for example locally stored, subscription information.

In a second aspect, there is provided a method of providing subscription information of a User Equipment, UE, in a communication network, wherein said communication network comprises a core network and at least one access network, wherein said core network is arranged to provide services to UE's connected to said core network via an access network The method comprises the step of receiving, by a subscriber node in said communication network, from a control node in said core network, a subscription request message, wherein said subscription request message requests subscription information for said UE and comprises an identification of a type of said access network, AN, via which said UE registration request message is received and an identification of a Radio Access Technology, RAT, type used by said UE for connecting to said access network.

The method further comprises the steps of determining, by said subscriber node, said subscription information based on said AN type and said RAT type, and transmitting, by said subscriber node, to said control node, a subscription response message comprising said determined subscription information.

The basic concept of the present disclosure is that the subscriber node is able to provide different subscription information based on differing AN types and RAT types.

In order to support that concept, the subscriber node may need to be able to provide the subscription information based on the AN type and the RAT type. Following the above, the subscriber node is to be made aware of the AN type and the RAT type. Such information is provided by the control node in a subscription request message.

Based on the information provided, the subscription node may need to determine the subscription information that are valid for that particular AN type and for that particular RAT type. The subscription node may, for example, look that particular information in a look-up table or may construe the information based on predefined conditions or rules.

The control node and/or the subscription node may comprise a processor and a memory, wherein the memory comprises instructions executable by the processor, whereby the control node and/or the subscription node is operative to perform any of the method steps directed to the nodes, as disclosed with the examples provided above.

In the context of the present invention, a module, device, equipment, or the like may also be implemented as a computer program running on the processor.

The expressions, i.e. the wording, of the different aspects comprised by the access node according to the present invention should not be taken literally. The wording of the aspects is merely chosen to accurately express the rationale behind the actual function of the aspects.

In accordance with the present invention, different aspects applicable to the above mentioned examples of the method, including the advantages thereof, correspond to the aspects which are applicable to any of the nodes according to the present disclosure.

In an example, said subscription response message further comprises an indication of whether said subscription information is valid for said AN type only.

In a further example, the subscriber node maintains criteria comprising at least one of:
  a list of authorized Access Point Names for said UE per AN type and per RAT type;
  a list of APN characteristics per AN type and per RAT type;
  Operator Determined Barring, ODB, of Access to all except some APNs per AN type and RAT type;
  wherein said step of determining comprises:
  determining, by said subscriber node, said subscription information by selecting at least one criteria based on said received AN type and RAT type.

In another example, the RAT type is one of:
  Wireless Local Area Network, WLAN, technology;
  High Rate Packet Data, HRPD, technology.

In an even further example, the AN type is any of:
  a 3GPP Access Network type;
  a non-3GPP access network type.

In a third aspect of the present disclosure, there is provided a control node for supporting registration of a User Equipment, UE, in a communication network, wherein said communication network comprises a core network and at least one access network, wherein said core network is arranged to provide services to UE's connected to said core network via an access network, said control node comprising:
  receive equipment arranged for receiving, from an access network, a registration request message for registering a UE in said communication network;
  transmit equipment arranged for transmitting, to a subscriber node in said communication network, a subscription request message, wherein said subscription request message requests subscription information for said UE and comprises an identification of a type of said access network, AN, via which said UE registration request message is received and an identification of a Radio Access Technology, RAT, used by said UE for connecting to said access network;

wherein said receive equipment is further arranged for receiving, from said subscriber node, a subscription response message comprising said subscription information for said UE based on said AN and said RAT;

wherein said transmit equipment is further arranged for transmitting, to said UE, a registration complete message for indicating that said UE has registered in the communication network.

Here, the subscription response message may further comprise an indication of whether said subscription information is valid for said AN type only.

In accordance with the present disclosure, the control node may be any of an Access and Mobility Management function, AMF, in a fifth Generation, 5G, network and a Mobility Management Entity, MME in a fourth Generation, 4G network.

In a fourth aspect, there is provided a subscriber node arranged for providing subscription information of a User Equipment, UE, in a communication network, wherein said communication network comprises a core network and at least one access network, wherein said core network is arranged to provide services to UE's connected to said core network via an access network, said subscriber node comprising:

receive equipment arranged for receiving, from a control node in said core network, a subscription request message, wherein said subscription request message requests subscription information for said UE and comprises an identification of a type of said access network, AN, via which said UE registration request message is received and an identification of a Radio Access Technology, RAT, type used by said UE for connecting to said access network;

process equipment arranged for determining said subscription information based on said AN type and said RAT type;

transmit equipment arranged for transmitting to said control node, a subscription response message comprising said determined subscription information.

Here, the subscription response message may further comprise an indication of whether said subscription information is valid for said AN type only.

In an example, the subscriber node comprises a database comprising criteria of at least one of:

a list of authorized Access Point Names for said UE per AN type and per RAT type;

a list of APN characteristics per AN type and per RAT type;

Operator Determined Barring, ODB, of Access to all except some APNs per AN type and RAT type;

wherein said step of determining comprises:

determining, by said subscriber node, said subscription information by selecting at least one criteria based on said received AN type and RAT type.

In an even further example said RAT type is one of:
Wireless Local Area Network, WLAN, technology;
High Rate Packet Data, HRPD, technology;
Evolved Universal Terrestrial Radio Access Network, EUTRAN
Narrowband Internet of Things, NB-IoT
GSM EDGE Radio Access Network, GERAN
Fifth Generation, 5G
New Radio, NR.

In an even further example, said AN type is any of:
a 3GPP Access Network type;
a non-3GPP access network type;

In a fifth aspect, there is provided a computer program product comprising computer readable instructions, which, when executed by a processors, accomplish said processor to perform the method in accordance with any of the method examples as provided above.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
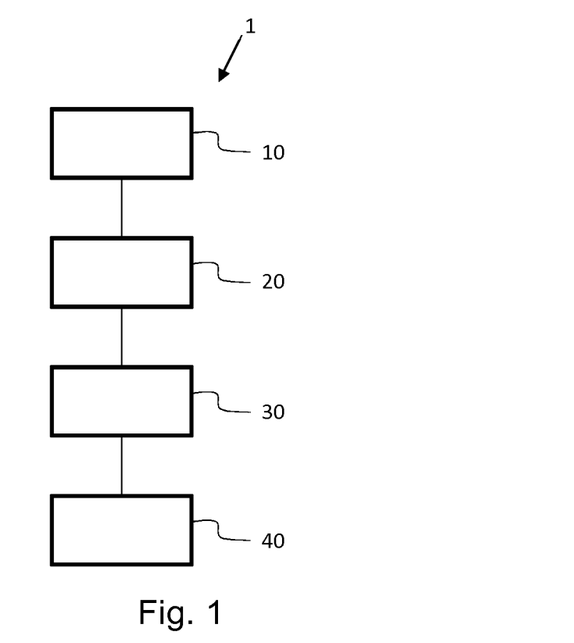
FIG. 1 is a schematic chart illustrating the basic steps involved in a method according to the present disclosure.

FIG. 1 is a schematic chart illustrating the basic steps involved in a method 1 according to the present disclosure. The first step 10, is the step wherein a control node in a core network of a communication network receives a registration request message for registering a User Equipment, UE, in said communication network. The communication network may be one of a telecommunication network such as those defined in the third Generation Partnership Project, 3GPP or an IP based communication network. The telecommunication network is, for example, a fourth Generation or fifth Generation type of network.

The control node may be any of Multimedia Entity, MME, Serving GPRS Support Node, SGSN, Authentication, Authorization and Accounting, AAA, or an Access and Mobility Function, AMF. Therefore, the method according to the present invention is applicable to both 3GPP and non-3GPP networks. The registration request message may comprise the International Mobile Subscriber Identity, IMSI, of the UE in the case wherein the communication network is a telecommunication network. For other networks, the request registration message may comprise a unique identifier of the identity of the UE.

In a second step, 20, of transmitting, the control node transmits a subscription request message to a subscriber node. The subscription request message is intended to extract the relevant subscription information pertaining to the particular UE and the Access Network, AN, and the Radio Access Technology, RAT. Therefore, the subscription request message comprises an indication of the type of the AN via which the UE request registration message is received and an identification of the RAT which is used by the UE to connect to said AN.

The subscriber node which receives the subscription request message is any of a Home Subscriber Server, HSS, Node or a Unified Data Management, UDM node. The subscriber node may maintain a subscription profile per AN and per RAT.

The subscriber node shall manage differentiated subscription information for each UE to be transferred to the control node depending on the AN and the RAT type. The main parts of the subscription data subject to be differentiated are:

- Authorized Access Point Names, APNs, per AN type and RAT type
- APN characteristics per AN type and RAT type. Most typically this could involve for example differentiated Default Quality of Service, QoS, profile and/or Local Breakout, LBO, flag settings within the APN configuration provided to the MME, 3GPP AAA and/or SMF.
- Operator Determined Barring, ODB, for all APNs including Barring of Access to All Except Some Specific APNs per AN type and RAT type.
- Any other subscription data can be potentially supported with the proposed mechanism.

In a third step 30 of receiving, the control node receives a subscription response message from the subscriber node. The subscription response message comprises subscription information for the UE depending on the AN and the RAT type. In an example of the method, the subscription response message also comprises an indication of whether or not the subscription information that is contained in the subscription response message is valid only for a particular AN or all other ANs as well.

In a step of transmitting 40, the control node sends a registration complete message to the UE indicating that the UE has been successfully registered in the communication network. Before sending the registration complete message, the control node stores the received subscription data in the subscription response message.

Figure 2:
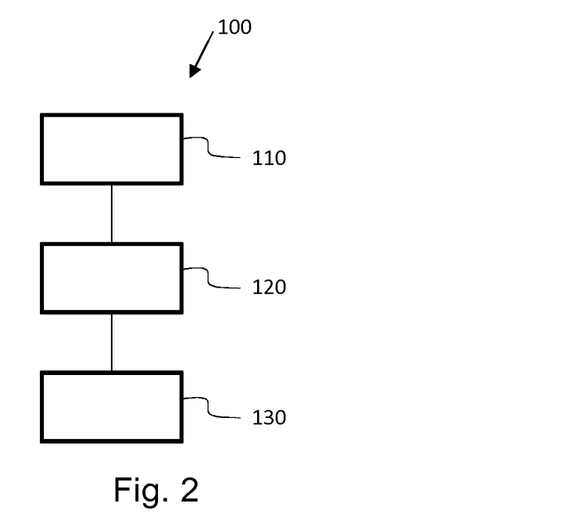
FIG. 2 is a schematic chart illustrating the basic steps involved in a method according to the present disclosure.

FIG. 2 is a schematic chart illustrating the basic steps involved in a method 100 according to the present disclosure. According to the method 100, a subscriber node receives 110 subscription request message from a control node. The subscription request message comprises information pertaining to the UE and identification of the AN and the RAT type being employed by the UE.

Once a subscription request message is received by the subscriber node in step 110, the subscriber node in step 120 may determine the subscription information based on the AN type and the RAT type indicated in the subscription request message. The subscriber node may maintain a list of subscription profiles per AN and per RAT type. In the step of determining 120, the subscriber node may authorize the request and it may determine the subscription profile depending on the indicated AN type and the RAT type.

The subscriber node may manage differentiated subscription information for each UE to be transferred to the control node depending on the AN and the RAT type. The main parts of the subscription data subject to be differentiated are:

- Authorized Access Point Names, APNs, per AN type and RAT type
- APN characteristics per AN type and RAT type. Most typically this could involve for example differentiated Default Quality of Service, QoS, profile and/or Local Breakout, LBO, flag settings within the APN configuration provided to the MME, 3GPP AAA and/or SMF.
- Operator Determined Barring, ODB, for all APNs including Barring of Access to All Except Some Specific APNs per AN type and RAT type.
- Any other subscription data can be potentially supported with the proposed mechanism In the step of determining 120, the subscriber node may determine the subscription information by selecting at least any one of the above mentioned criteria depending on the AN type and the RAT type.

In a step of transmitting 130, the subscriber node may transmit a subscription response message to the control node. The subscription response message may comprise the determined subscription information that is determined in the step 120. The subscription response message may further comprise an indication of whether the subscription information is valid only for a particular AN or not.

Figure 3:
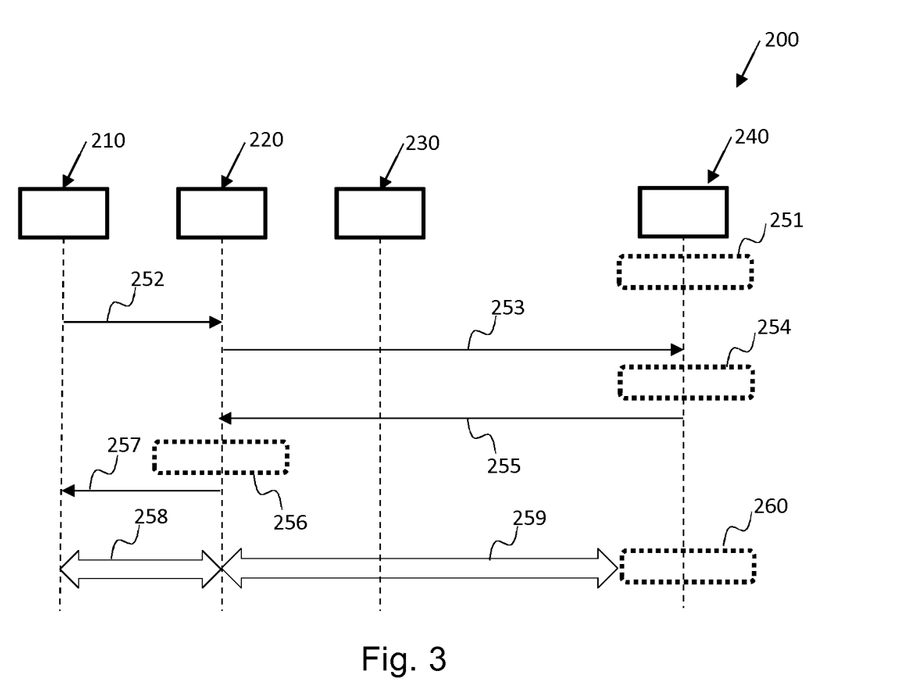
FIG. 3 is a schematic chart illustrating an example of the system.

FIG. 3 is a schematic chart 200 illustrating an example of the system. The schematic chart 200 illustrates a signalling diagram according to an aspect of the present disclosure. The schematic chart 200 comprises nodes 210, 220, 230 and 240 in a communication network. The communication network may also comprise additional nodes other than those indicated in the figure, but for the purposes of the present invention, the following nodes are considered. The UE 210, the control node 220, the Session Management Function SMF, 230 and the subscriber node 240.

The subscriber node 240, maintains 251 subscription profiles depending on the AN type and the RAT type. The UE 210 sends a registration request 252 to the control node 220. The registration request may include a unique identifier of the UE within the communication network. Upon receiving the registration request from the UE, the control node may send a subscription request message 253 to the subscriber node 240. The subscription request message 253 may comprise the unique identifier in received by the control node 220. The control node 220 may further includes the AN type and the RAT type used by the UE 210 to access the communication network.

Upon receiving the subscription request message, the subscriber node 240 may authorize the registration request and also may also select the subscription profile depending on the indicated AN type and the Rat type. This selection is based on the subscription profile 251 maintained in the subscriber node 240. Once a selection is made, the selected subscription data may be provided to the control node 220. The control node 220 may then store 256 the subscription data and may send the registration complete message 257 to the UE 210.

If at a later stage, the UE 210 seeks to access the communication network via a different AN or a different RAT type, the UE may send the indication 258 to the control node and the control node may communicate 259 with the subscriber node 240 to obtain the subscription profile for the new AN/RAT type 260.

Figure 4:
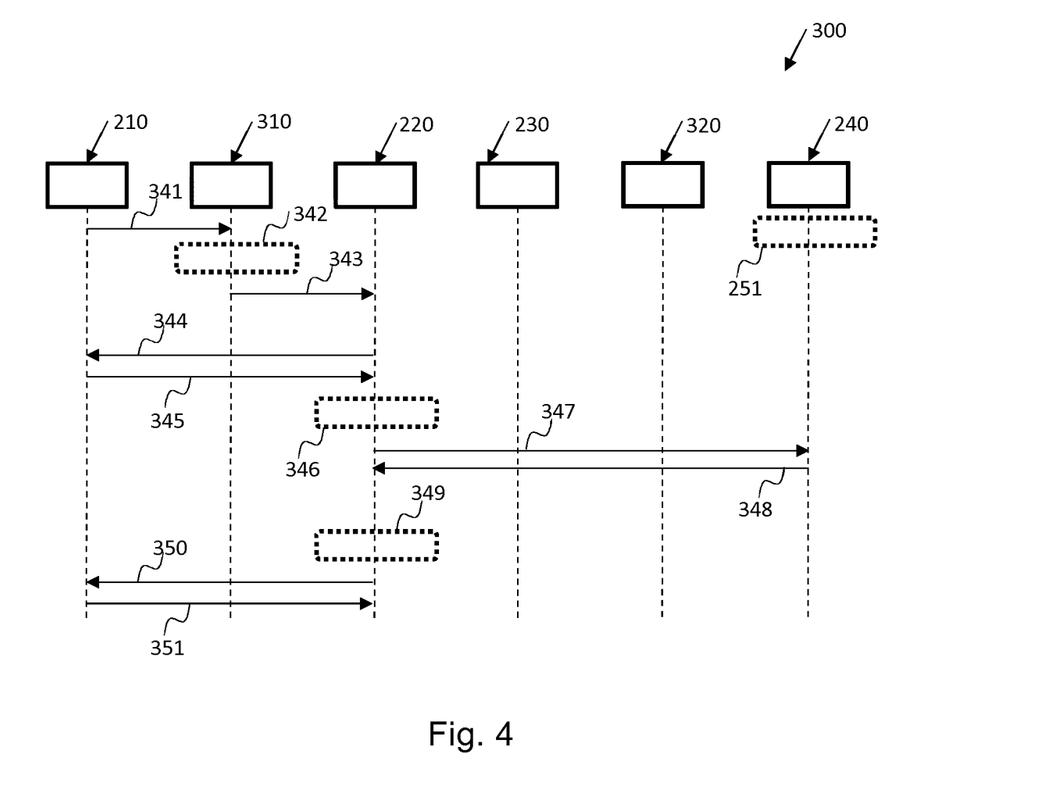
FIG. 4 is a schematic chart illustrating another example of the system.

FIG. 4 is a schematic chart 300 illustrating another example of the system. The schematic chart 300 illustrates a signalling diagram according to an aspect of the invention. With reference to FIG. 3, the chart 300 shown in FIG. 4 contains the additional nodes of an Access Network, AN, 310, and Authentication Server Function, AUSF 320.

The UE 210 may send a registration request message 341 to the AN 310. This registration request message 341 may be received by a base station such as the eNodeB in the communication network. Upon receiving the registration request message 341, the Access Network may select 342 an AMF that can provide access for the UE 210 to a communication network. The AN 310 forwards the registration request message 343 to the AMF 220. The AN may also include an indication of the RAT type used by the UE 210 to access the communication network.

Upon receiving the Registration request by the AMF 220, the AMF is aware of the AN type and the RAT type. As mentioned earlier, the RAT type may be indicated by the AN in the registration request message 343. Alternately the UE 210 itself may include an indication of the RAT type in the registration request message 341 sent to the AN 310. In another possible alternative, the unique ID of the UE 210 may indicate that it is capable of accessing communication networks only via a particular RAT type and hence the RAT type may be determined inherently by the AN 310.

The AN type may be determined by the AMF based on the received registration request message 343. The AMF 220, is therefore aware of both the AN type and the RAT type used by the UE to access the communication network. The AMF 220 sends an identity request 344 to the UE 210 an receives a corresponding identity response 347 from the UE. Thus the AMF is now aware of the identity of the UE 210, the AN type and the RAT type. With this information, the AMF 220 selects 346 a corresponding AUSF 320. The AMF 110 also sends a subscription request message 347 to the subscriber node 240 and receives a corresponding subscription response message 348.

Once the subscription response message 347 is received, the AMF 220 selects 351 a corresponding PCF depending on the received subscription information. As a last step, the AMF also confirms 352, 353 the registration of the UE in the communication network.

Figure 5:
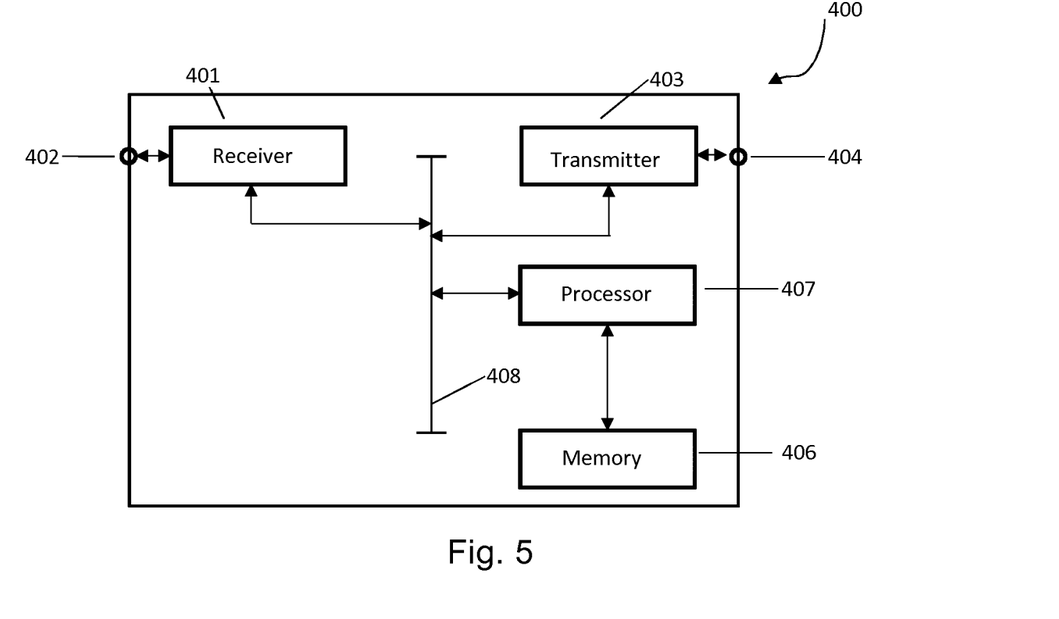
FIG. 5 is a schematic chart illustrating an example of a network element.

FIG. 5 is a schematic chart illustrating an example of a network element 400 such as a control node 220. The node comprises of receiver 401, 402 to receive messages from other nodes in the communication network. The network element also comprises of transmitter 403, 404 to send messages to other nodes in the communication network. The node 400 also comprises a processor 407, and memory 406. All the modules interact with one another and the processor 507 via a communication bus 408. The memory 406 is further arranged to store a computer program product which when executed by the processor 407 performs a method according to the present disclosure.

Figure 6:
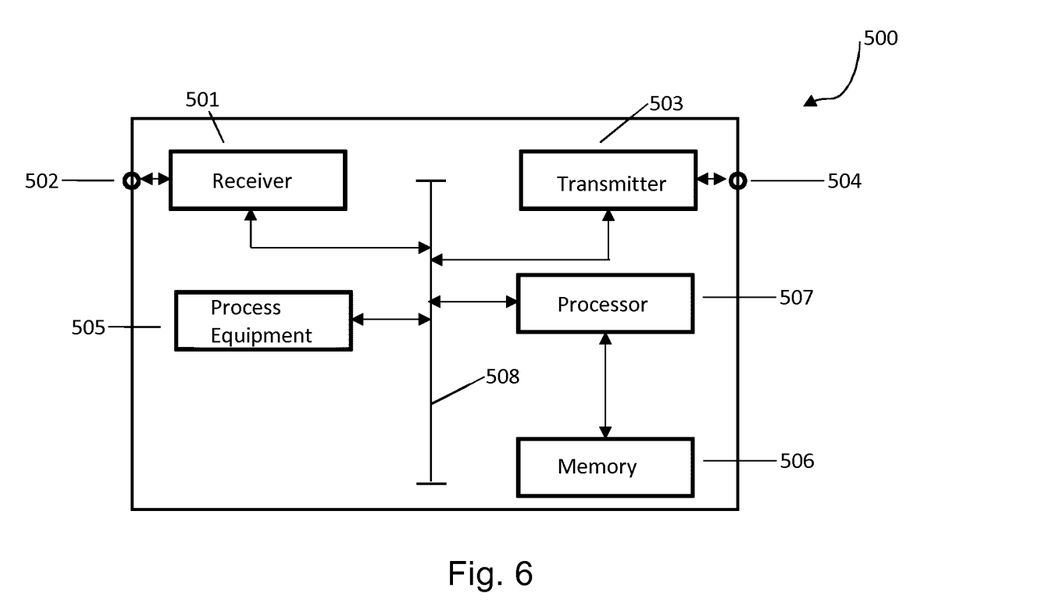
FIG. 6 is a schematic chart illustrating an example of a network element.

FIG. 6 is a schematic chart illustrating an example of a network element 500 such as a subscriber node 240. The node comprises of receiver 501, 502 to receive messages from other nodes in the communication network. The network element also comprises of transmitter 503, 504 to send messages to other nodes in the communication network. The network element 500 further comprises process equipment 505 which is arranged to determine the subscription information based on the received AN type and the RAT type. The node 500 also comprises a processor 507, and memory 506. All the modules interact with one another and the processor 507 via a communication bus 508. The memory 506 is further arranged to store a computer program product which when executed by the processor 407 performs a method according to the present disclosure.

In the description, wherever applicable, the term "control node" may refer to any of MME, SGSN, AAA and AMF. The term "subscriber node" may refer to any of HSS and UDM. The AN type may be any of 3GPP or non-3GPP. The person skilled in the art understands that the 3GPP access network type refers to New Radio, NR, and non-3GPP access types refers to Wi-Fi, Fix access, for example.

The RAT type may be any of Wireless Local Area Network, WLAN, technology, High Rate Packet Data, HRPD, technology Evolved Universal Terrestrial Radio Access Network, EUTRAN, Narrowband Internet of Things, NB-IoT, GSM EDGE Radio Access Network, GERAN, Fifth Generation, 5G, New Radio, NR, for example.

Other variations to the disclosed examples can be understood and effected by those skilled in the art in practicing the claimed disclosure, from a study of the drawings, the disclosure and the appended claims. In the claims, the word "comprising" does not exclude other elements or steps, and the indefinite article, "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of registering a User Equipment, UE, in a communication network, said method comprising:
   receiving, by a control node in a core network of the communication network, from an access network of the communication network, a registration request message for registering a UE in said communication network;
   transmitting, by said control node, to a subscriber node in said communication network, a subscription request message, wherein said subscription request message requests subscription information for said UE and comprises an identification of a type of said access network, AN, via which said UE registration request message is received and an identification of a Radio Access Technology, RAT, type used by said UE for connecting to said access network;
   receiving, by said control node, from said subscriber node, a subscription response message comprising said subscription information for said UE based on said type of said AN and said RAT type; and
   transmitting, by said control node, to said UE, a registration complete message for indicating that said UE has registered in the communication network.

2. A method in accordance with claim 1, wherein said subscription response message further comprises an indication of whether said subscription information is valid for said type of AN only.

3. A method in accordance with claim 1, wherein said RAT type is one of:
   Wireless Local Area Network, WLAN, technology; or
   High Rate Packet Data, HRPD, technology.

4. A method in accordance with claim 1, wherein said type of AN is any of:
   a 3GPP Access Network type; or
   a non-3GPP access network type.

5. A method of providing subscription information of a User Equipment, UE, in a communication network, said method comprising:
   receiving, by a subscriber node in said communication network, from a control node in a core network of the communication network, a subscription request message, wherein said subscription request message requests subscription information for said UE and comprises an identification of a type of an access network, AN, via which said UE registration request message is received and an identification of a Radio Access Technology, RAT, type used by said UE for connecting to said access network;

determining, by said subscriber node, said subscription information based on said type of AN and said RAT type; and transmitting, by said subscriber node, to said control node, a subscription response message comprising said determined subscription information.

6. A method in accordance with claim 5, wherein said subscription response message further comprises an indication of whether said subscription information is valid for said type of AN only.

7. A method in accordance with claim 5, wherein said subscriber node maintains criteria comprising at least one of:
a list of authorized Access Point Names for said UE per AN type and per RAT type;
a list of APN characteristics per AN type and per RAT type;
Operator Determined Barring, ODB, of Access to all except some APNs per AN type and RAT type;
wherein said step of determining comprises:
determining, by said subscriber node, said subscription information by selecting at least one criteria based on said type of AN and said RAT type.

8. A method in accordance with claim 5, wherein said RAT type is one of:
Wireless Local Area Network, WLAN, technology; or
High Rate Packet Data, HRPD, technology.

9. A method in accordance with claim 5, wherein said type of AN is any of:
a 3GPP Access Network type; or
a non-3GPP access network type.

10. A control node for supporting registration of a User Equipment, UE, in a communication network, said control node comprising:
receive equipment configured to receive, from an access network of the communication network, a registration request message for registering a UE in said communication network; and
transmit equipment configured to transmit, to a subscriber node in said communication network, a subscription request message, wherein said subscription request message requests subscription information for said UE and comprises an identification of a type of said access network, AN, via which said UE registration request message is received and an identification of a Radio Access Technology, RAT, type used by said UE for connecting to said access network;
wherein said receive equipment is further configured to receive, from said subscriber node, a subscription response message comprising said subscription information for said UE based on said type of said AN and said RAT type;
wherein said transmit equipment is further arranged for transmitting, to said UE, a registration complete message for indicating that said UE has registered in the communication network.

11. A control node in accordance with claim 10, wherein said subscription response message further comprises an indication of whether said subscription information is valid for said type of AN only.

12. A control node in accordance with claim 10, wherein said control node is any of an Access and Mobility Management function, AMF, and a Mobility Management Entity, MME.

13. A control node in accordance with claim 10, wherein said RAT type is one of:
Wireless Local Area Network, WLAN, technology;
High Rate Packet Data, HRPD, technology;
Evolved Universal Terrestrial Radio Access Network, EUTRAN;
Narrowband Internet of Things, NB-IoT;
GSM EDGE Radio Access Network, GERAN;
Fifth Generation, 5G; or
New Radio, NR.

14. A control node in accordance with claim 10, wherein said AN type is any of:
a 3GPP Access Network type; or
a non-3GPP access network type.

15. A subscriber node configured to provide subscription information of a User Equipment, UE, in a communication network, said subscriber node comprising:
receive equipment configured to receive, from a control node in a core network of the communication network, a subscription request message, wherein said subscription request message requests subscription information for said UE and comprises an identification of a type of an access network, AN, via which said UE registration request message is received and an identification of a Radio Access Technology, RAT, type used by said UE for connecting to said access network;
process equipment configured to determine said subscription information based on said type of AN and said RAT type; and
transmit equipment configured to transmit, to said control node, a subscription response message comprising said determined subscription information.

16. A subscriber node in accordance with claim 15, wherein said subscription response message further comprises an indication of whether said subscription information is valid for said type of AN only.

17. A subscriber node in accordance with claim 15, wherein said subscriber node comprises a database comprising criteria of at least one of:
a list of authorized Access Point Names for said UE per AN type and per RAT type;
a list of APN characteristics per AN type and per RAT type; and
Operator Determined Barring, ODB, of Access to all except some APNs per AN type and RAT type;
wherein the process equipment is configured to determine said subscription information by selecting at least one criteria based on said type of AN and said RAT type.

18. A subscriber node in accordance with claim 15, wherein said RAT type is one of:
Wireless Local Area Network, WLAN, technology;
High Rate Packet Data, HRPD, technology;
Evolved Universal Terrestrial Radio Access Network, EUTRAN;
Narrowband Internet of Things, NB-IoT;
GSM EDGE Radio Access Network, GERAN;
Fifth Generation, 5G; or
New Radio, NR.

19. A subscriber node in accordance with claim 15, wherein said AN type is any of:
a 3GPP Access Network type; or
a non-3GPP access network type.

20. A method in accordance with claim 1, wherein said subscription information for said UE comprises:
one or more authorized Access Point Names specific to said type of said AN and said RAT type;
one or more APN characteristics specific to said type of said AN and said RAT type; and/or
Operator Determined Barring, ODB, of Access to all except some APNs specific to said type of said AN and said RAT type.

21. A control node in accordance with claim 10, wherein said subscription information for said UE comprises:
- one or more authorized Access Point Names specific to said type of said AN and said RAT type;
- one or more APN characteristics specific to said type of said AN and said RAT type; and/or
- Operator Determined Barring, ODB, of Access to all except some APNs specific to said type of said AN and said RAT type.

* * * * *